United States Patent
Takeshima et al.

(10) Patent No.: US 7,138,353 B2
(45) Date of Patent: Nov. 21, 2006

(54) PARTICULATE BURNING CATALYST

(75) Inventors: Shinichi Takeshima, Susono (JP); Tetsuya Yamashita, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 105 days.

(21) Appl. No.: 10/088,648

(22) PCT Filed: Jul. 23, 2001

(86) PCT No.: PCT/JP01/06351

§ 371 (c)(1),
(2), (4) Date: Mar. 20, 2002

(87) PCT Pub. No.: WO02/07879

PCT Pub. Date: Jan. 31, 2002

(65) Prior Publication Data

US 2002/0197191 A1    Dec. 26, 2002

(30) Foreign Application Priority Data

Jul. 24, 2000    (JP) ............................. 2000-227577

(51) Int. Cl.
- B01J 21/12 (2006.01)
- B01J 29/06 (2006.01)
- B01J 23/40 (2006.01)
- B01J 21/06 (2006.01)

(52) U.S. Cl. ............ 502/64; 502/66; 502/74; 502/325; 502/328; 502/330; 502/339; 502/261; 502/262; 502/350; 502/349

(58) Field of Classification Search .......... 502/64, 502/66, 74, 325, 328, 330, 339, 261, 262, 502/350, 349
See application file for complete search history.

(56) References Cited

U.S. PATENT DOCUMENTS

| | | | |
|---|---|---|---|
| 4,902,487 A | 2/1990 | Cooper et al. | |
| 5,849,254 A * | 12/1998 | Suzuki et al. | 423/213.5 |
| 5,853,693 A | 12/1998 | Ogasawara et al. | |
| 6,677,264 B1 * | 1/2004 | Klein et al. | 502/74 |
| 2002/0013228 A1 * | 1/2002 | Matsumoto | 502/325 |

FOREIGN PATENT DOCUMENTS

| | | |
|---|---|---|
| EP | 0 160 482 A2 | 11/1985 |
| EP | 0 852 966 A1 | 7/1998 |
| EP | 0 931 590 A1 | 7/1999 |
| EP | 0 993 860 A1 | 4/2000 |
| EP | 1 004 347 A2 | 5/2000 |
| EP | 1 008 378 * | 6/2000 |
| EP | 1 055 805 A1 | 11/2000 |
| EP | 1 057 519 A1 | 12/2000 |
| GB | 2 342 056 A | 4/2000 |
| JP | A 61-149222 | 7/1986 |
| JP | A 63-147912 | 6/1988 |
| JP | B2 7-106290 | 11/1995 |
| JP | A 9-323039 | 12/1997 |
| JP | A 10-118454 | 5/1998 |
| JP | B2 3012249 | 12/1999 |
| JP | 2000-157870 | 6/2000 |
| JP | A 2001-205109 | 7/2001 |
| WO | WO 98/09699 | 3/1998 |
| WO | WO 00/03790 | 1/2000 |
| WO | WO 01/12320 A1 | 2/2001 |

* cited by examiner

Primary Examiner—Elizabeth D. Wood
(74) Attorney, Agent, or Firm—Oliff & Berridge, PLC

(57) ABSTRACT

There is provided a particulate matter combustion catalyst which allows easy combustion of particulate matter collected on the particulate matter filter of a diesel vehicle, at a much lower temperature than by the prior art. The particulate matter combustion catalyst has a construction characterized by an NO oxidation catalyst wherein the catalyst component is carried on an acidic first carrier, and an $NO_2$ decomposition catalyst wherein the catalyst component is carried on a second carrier. Preferably, the NO oxidation catalyst has a precious metal such as platinum carried on an acidic first carrier such as tungstic acid/zirconia, and the $NO_2$ decomposition catalyst has a catalyst component selected from the transition metals carried on a second carrier such as titania, or alternatively, the $NO_2$ decomposition catalyst has at least one metal selected from among alkali metals and alkaline earth metals and a precious metal such as platinum carried on a second carrier such as titania.

5 Claims, 2 Drawing Sheets

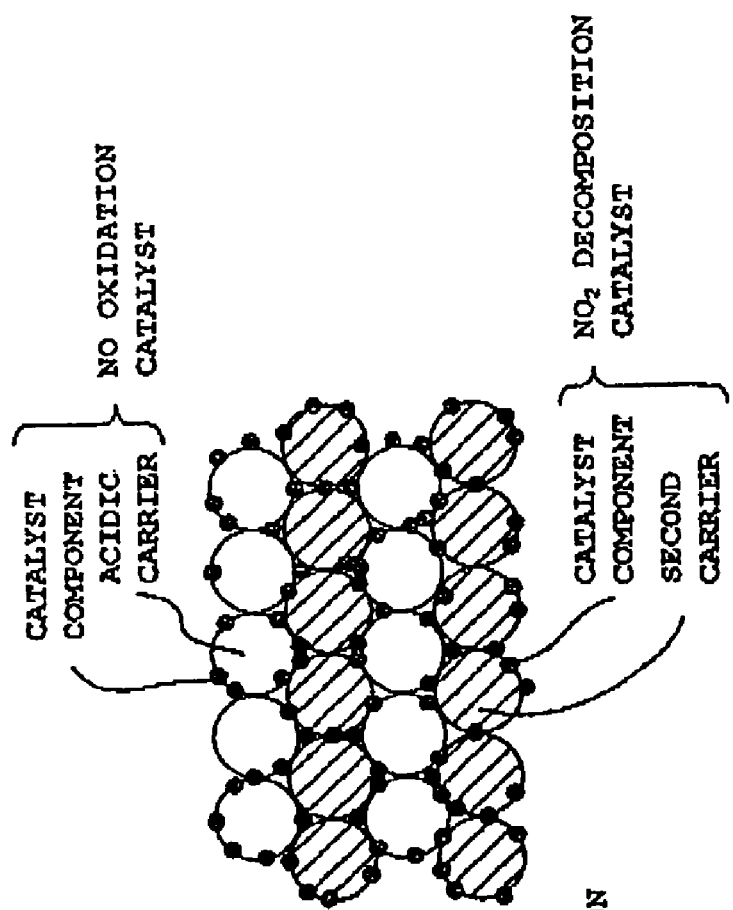
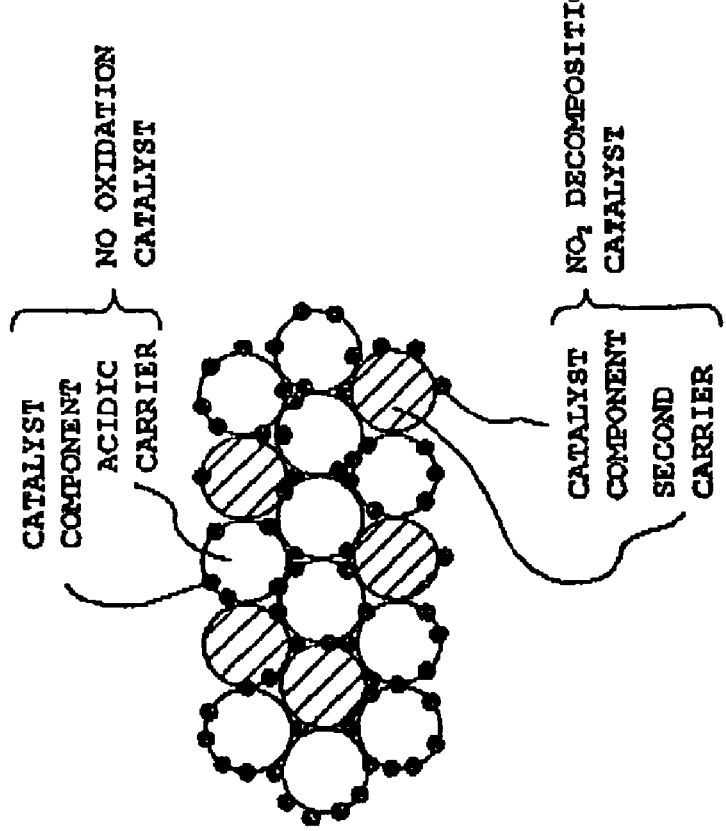

PARTICULATE BURNING CATALYST

TECHNICAL FIELD

The present invention relates to a catalyst for combustion removal of soot-like particulate matter (carbonaceous fine particles) contained in exhaust gas emitted from internal combustion engines such as diesel engines.

BACKGROUND ART

Exhaust gas emitted from diesel engines contains particulate matter and constitutes one of the causes of local air pollution. Reduction of particulate matter emissions is one of the major environmental issues for which a swift solution is desired.

In order to reduce particulate matter emissions, much research is being devoted to studying systems wherein a particulate matter filter is situated in the diesel engine exhaust path to collect particulate matter in exhaust gas, and the collected particulate matter is then ignited and combusted. However, the particulate matter collected on the particulate matter filter does not ignite unless heated to a temperature of above approximately 600° C., whereas diesel engine exhaust gas temperatures are usually much lower than 600° C., and therefore the ignition temperature of the particulate matter must be lowered in order to achieve combustion removal of the particulate matter in the exhaust gas flow.

Incidentally, it has conventionally been known that catalysts carried on particulate matter filters can reduce the ignition temperature of the particulate matter, and for example, Japanese Examined Patent Publication HEI No. 7-106290 discloses a particulate matter filter carrying a mixture of a platinum-based metal and an alkaline earth metal oxide. With this particulate matter filter, the particulate matter ignites at a relatively low temperature of about 350–400° C., and is subsequently combusted in a continuous manner.

However, since the exhaust gas temperature during actual operation of a diesel engine is often below 350° C., it is impossible to achieve complete combustion removal of particulate matter at the aforementioned ignition temperature of about 350–400° C., and therefore pressure loss of the exhaust gas through the filter increases, creating the problem of fuel efficiency reduction. Moreover, combustion of abundant residue of particulate matter leads to exposure of the particulate matter filter to temperatures of above approximately 800° C., resulting in problems such as more rapid deterioration of the particulate matter filter.

It is therefore an object of the present invention to provide a particulate matter purifying catalyst which can easily oxidize particulate matter collected on particulate matter filters at a much lower temperature than is possible by the prior art.

DISCLOSURE OF THE INVENTION

The object of the present invention is achieved by a particulate matter purifying catalyst characterized by comprising an NO oxidation catalyst wherein the catalyst component is carried on an acidic first carrier, and an $NO_2$ decomposition catalyst wherein the catalyst component is carried on a second carrier.

That is, the invention relates to a catalyst comprising both an NO oxidation catalyst and an $NO_2$ decomposition catalyst, wherein the catalytic effects of both the NO oxidation and $NO_2$ decomposition are combined to promote oxidation of particulate matter.

The action mechanism of the catalyst of the invention is believed to be as follows.

The NO oxidation catalyst promotes the following reaction.

$$NO + 1/2 O_2 \rightarrow NO_2 \qquad (1)$$

The $NO_2$ decomposition catalyst promotes the following reaction, releasing active oxygen (O').

$$NO_2 \rightarrow NO + O' \qquad (2)$$

Active oxygen exhibits extremely high activity for oxidation of particulate matter.

The active oxygen is produced by the following $O_2$ dissociation reaction.

$$O_2 \rightarrow 2O' \qquad (3)$$

However, the reaction rate of chemical equation (3) is much lower than the reaction rate of chemical equation (2) at temperatures under about 300° C. Consequently, while the NO in diesel engine exhaust gas is at a lower concentration than $O_2$, acceleration of the aforementioned reactions (1) and (2) effectively promotes combustion of the particulate matter.

The NO oxidation catalyst of the invention having a construction with a catalyst component such as platinum carried on an acidic carrier is capable of notably accelerating the reaction of (1) above. This is because the catalyst component resides on an acidic carrier, i.e., the catalyst component such as platinum is exposed to an acidic condition by the action of the acidic carrier, such that the acidic $NO_2$ produced by oxidation is easily released from the catalyst component.

Consequently, a large amount of $NO_2$ is supplied from the NO oxidation catalyst by reaction (1), after which the decomposition catalyst component produces active oxygen from the $NO_2$ by reaction (2), thereby allowing efficient supply of a large amount of active oxygen from the NO contained in the exhaust gas, so that the particulate matter can be oxidized at a high rate even when the exhaust gas temperature is below approximately 300° C.

The present inventors believe the particulate matter oxidation mechanism to be as follows. The particulate matter structure is a structure comprising aggregates of fine planar hexagonal graphite, and since the number of carbon bonds is lower at the edge sections thereof, the pi electron density of the bonds is higher than at the plane sections. For this reason, the electrophilic active oxygen O' is attracted to the high electron dense sections and attacks the carbon bonds, oxidizing them. That is, it is thought that the particulate matter with a graphite structure is readily oxidized by the essentially electrophilic active oxygen, and therefore the abundant production of active oxygen promotes low-temperature particulate matter oxidation.

BRIEF DESCRIPTION OF THE DRAWINGS

FIG. 2(a) is a schematic illustration of a coated layer interior carrying the catalysts of the invention.

FIG. 2(b) is a schematic illustration of a coated layer interior carrying the catalysts of the invention.

BEST MODE FOR CARRYING OUT THE INVENTION

Figure 1A:
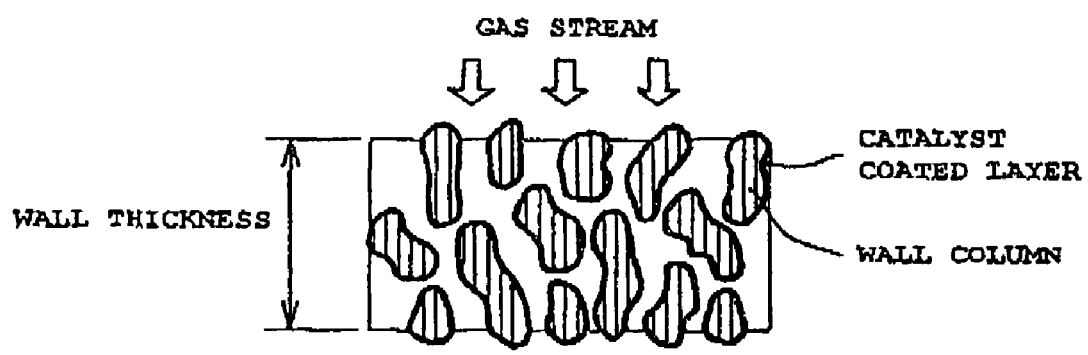
FIG. 1(a) is a schematic illustration of a wall cross-section of a filter carrying the catalysts of the invention.

The NO oxidation catalyst constituting one of the particulate matter purifying catalysts of the invention comprises a catalyst component with NO oxidation performance such as platinum, gold, ruthenium, rhodium, iridium, palladium or the like, carried on an acidic carrier. As acidic carriers there may be mentioned powders composed of particles with homogeneous components, such as silica, silica-alumina and zeolite with an $SiO_2/Al_2O_3$ ratio of 40 or greater.

The acidic carrier may also be tungstic acid/zirconia, antimonic acid/alumina or the like, prepared by coating weakly acidic or amphoteric particles such as zirconia or alumina with an acidic substance such as tungstic acid or antimonic acid. These may be obtained, for example, by immersing zirconia or alumina in an ammonium metatungstate aqueous solution as a tungstic acid precursor or an antimony sulfate aqueous solution as an antimonic acid precursor, evaporating to dryness, and then firing.

The catalyst component such as platinum may be loaded on the acidic carrier by evaporative drying, precipitation, adsorption, ion-exchange, reductive deposition or the like.

The $NO_2$ decomposition catalyst constituting the other particulate matter purifying catalyst of the invention has the catalyst component carried on a second carrier. This catalyst component may be selected as desired from the group of transition metals, among which there may be mentioned iron, manganese, cobalt, copper, nickel, vanadium, yttrium, zinc, niobium and molybdenum.

The catalyst component of the $NO_2$ decomposition catalyst may also be at least one type of metal selected from among alkali metals and alkaline earth metals, among which there may be selected as desired, lithium, sodium, potassium, rubidium, cesium, francium, beryllium, magnesium, calcium, strontium, barium and the like.

It was found that when an alkali metal or alkaline earth metal is used as the catalyst component of the $NO_2$ decomposition catalyst, the $NO_2$ decomposition is further promoted if it is carried together with a precious metal selected from the group consisting of platinum, gold, ruthenium, rhodium, iridium, palladium and mixtures thereof.

No particular restrictions are required for the second carrier on which the catalyst component of the $NO_2$ decomposition catalyst is carried, but it is preferably selected from among weakly acidic or amphoteric substances such as titania, zirconia, titania-zirconia, alumina, silica and the like.

Loading of the catalyst component of the $NO_2$ decomposition catalyst on the second carrier may be accomplished in the same manner as the NO oxidation catalyst, by evaporative drying, precipitation, adsorption, ion-exchange, reductive deposition or the like using, for example, a solution of the catalyst component.

The proportion of the components of the particulate matter purifying catalyst of the invention is not particularly restricted, but an NO oxidation catalyst/$NO_2$ decomposition catalyst ratio of 1/6–6/1 and especially 1/3–3/1, in terms of weight, is preferred. The catalyst component in the NO oxidation catalyst constitutes preferably 0.5–10 parts by weight and more preferably 1.5–3 parts by weight to 100 parts by weight of the acidic carrier. The catalyst component in the $NO_2$ decomposition catalyst constitutes preferably 1–40 parts by weight and more preferably 2–10 parts by weight to 100 parts by weight of the second carrier.

The particulate matter purifying catalyst of the invention is carried on a particulate matter filter, to allow promotion of continuous oxidation of particulate matter collected on the particulate matter filter.

Figure 1B:
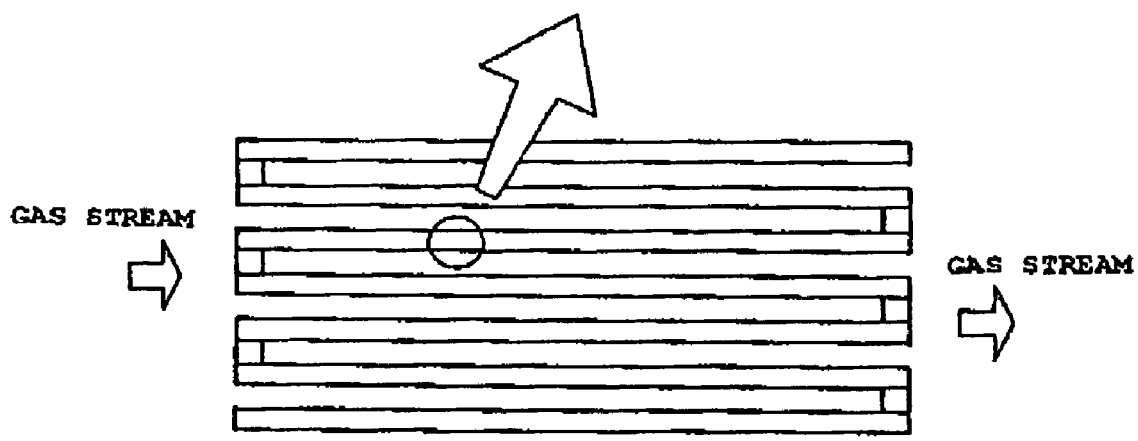
FIG. 1(b) is a schematic illustration of a cross-section of a filter carrying the catalysts of the invention.

The particulate matter filter may be, for example cordierite wall-flow type filter, and an embodiment of a filter using the catalyst of the invention is shown in FIG. 1. The wall-flow type filter is, for example, one of any two neighboring spaces is closed by a plug on the exhaust gas downstream side, and the other one is closed by a plug on the exhaust gas upstream side.

In this embodiment, the NO oxidation catalyst and $NO_2$ decomposition catalyst of the invention reside as a coated layer covering the wall columns of the filter. In the coated layer, the NO oxidation catalyst and $NO_2$ decomposition catalyst may reside in a randomly mixed state as shown in FIG. 2(*a*), or they may reside in layers as shown in FIG. 2(*b*).

EXAMPLES

Effect of Carrier on NO Oxidation Performance

Tungstic acid/zirconia ($WO_3/ZrO_2$). silica, silica-alumina, MFI zeolite ($SiO_2/Al_2O_3$=40), dealuminized Y zeolite ($SiO_2/Al_2O_3$=200), γ-alumina, zirconia and Ba/γ-alumina were prepared as carriers, and after coating each of the carriers onto monolith substrates, each carrier was impregnated with a dinitrodiamine Pt solution and subjected to drying and prefiring followed by 1 hour of firing at 650° C. to obtain catalysts with 2 g of Pt loaded on each carrier per liter volume of substrate.

The $WO_3/ZrO_2$ was the carrier for the NO oxidation catalyst, prepared by the method of Example 1 described below. The Ba/γ-alumina was the carrier prepared by the method of Comparative Example 1.

The catalysts were each subjected to a stream of gas with the composition shown below, and the NO→$NO_2$ oxidation rate was measured at gas temperatures of 200° C. and 250° C. The results are shown in Table 1.

Gas composition: 250 ppm NO+1 ppm $SO_2$+5% $H_2O$+6% $CO_2$+6% $O_2$ (remainder: nitrogen)

TABLE 1

Comparison of NO oxidation performance

| Catalyst carrier | NO oxidation rate (%) | |
|---|---|---|
| | 200° C. | 250° C. |
| $WO_3/ZrO_2$ | 64 | 93 |
| Silica | 45 | 92 |
| Silica-alumina | 34 | 92 |
| MFI zeolite | 66 | 92 |
| Y zeolite | 62 | 93 |
| γ-alumina | 15 | 90 |
| Zirconia | 17 | 90 |
| Ba/γ-alumina | 8.5 | 20 |

Catalyst component: 2 g Pt/1 L filter

The results shown in Table 1 demonstrate that the acidic carriers $WO_3/ZrO_2$, silica, silica-alumina, MFI zeolite and dealuminized Y zeolite exhibited notably higher No oxidation rates at 200° C. compared to the γ-alumina (amphoteric), zirconia (weakly acidic) and Ba/γ-alumina (basic). The reason for the extremely low NO oxidation rate of Ba/γ-alumina is believed to be inhibition of Pt oxidation performance by the basic Ba.

Example 1

After adding 20 parts by weight of an ammonium metatungstate aqueous solution containing $WO_3$ at a 50 wt % concentration to 91 parts by weight of zirconium hydroxide powder, the resulting mixture was dried overnight at 80° C. and then fired at 650° C. for 2 hours to obtain tungstic acid/zirconia ($WO_3/ZrO_2$) powder.

Separately, 85 parts by weight of a 40 wt % barium acetate aqueous solution was added to 100 parts by weight of γ-alumina powder, and the resulting mixture was dried overnight at 80° C. and then fired at 500° C. for 1 hour to obtain Ba/γ-alumina powder.

To 100 parts by weight of the $WO_3/ZrO_2$ powder and 100 parts by weight of the Ba/γ-alumina powder there were added 60 parts by weight of a 40 wt % concentration aluminum nitrate solution, 40 parts by weight of ceria/zirconia powder and 200 parts by weight of water, and the components were mixed with a ball mill for 8 hours.

The resulting slurry was coated and dried onto a filter substrate, and then fired at 650° C. for 1 hour to form a layer containing $WO_3/ZrO_2$ powder and Ba/γ-alumina powder on the filter substrate.

Next, the layer was impregnated with a dinitrodiamine Pt aqueous solution, and then further impregnated with a Rh nitrate aqueous solution and fired at 500° C. for 1 hour to obtain a catalyst according to the invention carrying 2 g of Pt and 0.1 g of Rh per liter of filter substrate.

Example 2

$WO_3/ZrO_2$ powder was obtained in the same manner as Example 1.

After separately impregnating 100 parts by weight of γ-alumina powder with a solution containing 5 wt % Fe, the powder was dried overnight at 80° C. and then fired at 500° C. for 2 hour to obtain Fe/γ-alumina powder.

To 100 parts by weight of the $WO_3/ZrO_2$ powder and 100 parts by weight of the Fe/γ-alumina powder there were added 60 parts by weight of aluminum nitrate solution, 40 parts by weight of ceria/zirconia powder and 200 parts by weight of water, in the same manner as Example 1, and the components were mixed with a ball mill for 8 hours.

The resulting slurry was coated and dried onto a filter substrate, and then fired at 650° C. for 1 hour to form a layer containing $WO_3/ZrO_2$ powder and Fe/γ-alumina powder on the filter substrate.

Next, in the same manner as Example 1, the layer was impregnated with a dinitrodiamine Pt aqueous solution, and then further impregnated with a Rh nitrate aqueous solution and fired at 500° C. for 1 hour to obtain a catalyst according to the invention carrying 2 g of Pt and 0.1 g of Rh per liter of filter substrate.

Comparative Example 1

After adding 85 parts by weight of a 40 wt % barium acetate aqueous solution to 100 parts by weight of γ-alumina powder, the resulting mixture was dried overnight at 80° C. and then fired at 500° C. for 1 hour to obtain Ba/γ-alumina powder.

To 100 parts by weight of the Ba/γ-alumina powder there were added 30 parts by weight of a 40 wt % concentration aluminum nitrate solution, 20 parts by weight of ceria/zirconia powder and 100 parts by weight of water, and the components were mixed with a ball mill for 8 hours.

The resulting slurry was coated and dried onto a filter substrate, and then fired at 650° C. for 1 hour to form a layer containing Ba/γ-alumina powder.

Next, the layer was impregnated with a dinitrodiamine Pt aqueous solution, and then further impregnated with a Rh nitrate aqueous solution and fired at 500° C. for 1 hour to obtain a comparison catalyst carrying 2 g of Pt and 0.1 g of Rh per liter of filter substrate.

Comparative Example 2

To 100 parts by weight of silica powder there were added 30 parts by weight of a 40 wt % concentration aluminum nitrate solution, 20 parts by weight of ceria/zirconia powder and 100 parts by weight of water, and the components were mixed with a ball mill for 8 hours.

The resulting slurry was coated and dried onto a filter substrate, and then fired at 650° C. for 1 hour to form a layer containing silica powder.

Next, the layer was impregnated with a dinitrodiamine Pt aqueous solution, and then further impregnated with a Rh nitrate aqueous solution and fired at 500° C. for 1 hour to obtain a comparison catalyst carrying 2 g of Pt and 0.1 g of Rh per liter of filter substrate.

The catalyst with Pt and Rh carried on the acidic silica carrier was used for a comparative test in a system with $NO_2$ production by NO oxidation carried out upstream, and particulate matter combustion carried out downstream.

Comparison of $NO_2$ Decomposition Performance

The proportion of $NO_2$ decomposed to NO by the catalysts of Examples 1–2 and Comparative Examples 1–2 above was measured using diesel engine exhaust gas. Lean (air/fuel ratio=30) and rich (air/fuel ratio=14) operating conditions were employed, repeatedly alternated for 30 seconds and 1 second, respectively, and the $NO_2$ decomposition rate was measured based on the exhaust gas composition shown below, under lean conditions. The results are shown in Table 2. For the catalyst of Comparative Example 2, there was provided a particulate matter-accumulated monolith filter (without catalyst) downstream from the catalyst, and the $NO_2$ decomposition rate as measured at the outlet port of the filter.

Gas composition: 250 ppm NO+1 ppm $SO_2$+5% $H_2O$+6% $CO_2$+6% $O_2$ (remainder: nitrogen)

TABLE 2

Comparison of $NO_2$ decomposition performance

| Catalyst | | $NO_2$ decomposition rate (%) | |
|---|---|---|---|
| NO oxidation catalyst | $NO_2$ decomposition catalyst | 200° C. | 250° C. |
| Example 1 | Pt/$WO_3$/$ZrO_2$ | Pt/Ba/γ-alumina | 85 | 94 |
| Example 2 | Pt/$WO_3$/$ZrO_2$ | Fe/γ-alumina | 88 | 90 |
| Comp. Ex. 1 | Pt/Ba/γ-alumina | | 78 | 88 |
| Comp. Ex. 2 | Upstream Pt/silica + monolith filter | | 2.1 | 3.5 |

Catalyst components: (2 g Pt + 0.1 g Rh)/1 L filter

The results shown in Table 2 demonstrate that the catalysts of the invention exhibit very high $NO_2$ decomposition performance even at temperatures below 300° C. On the other hand, with Comparative Example 1 which had Pt and Ba both present on the γ-alumina carrier, the $NO_2$ decomposition performance was slightly lower than that of the catalysts of the invention. The catalyst of Comparative Example 2 exhibited absolutely no $NO_2$ decomposition performance. The reason is believed to be its structure wherein no catalyst was carried on the filter.

Comparison of Particulate Matter Oxidation Rates

The particulate matter oxidation rates of the catalysts of Examples 1–2 and Comparative Examples 1–2 above were measured using diesel engine exhaust gas. The operating conditions were continuous lean conditions (air/fuel ratio=30), where the particulate matter-containing exhaust gas with the composition shown below was fed to the catalyst-carrying particulate matter filter, and the particulate matter combustion rate was calculated from the particulate matter supply rate under conditions with the filter pressure loss at equilibrium. The results are shown in Table 3.

Gas composition: 250 ppm NO+1 ppm $SO_2$+5% $H_2O$+6% $CO_2$+6% $O_2$ (remainders nitrogen)

TABLE 3

Comparison of particulate matter (PM) combustion rates

| Catalyst | | PM combustion rate (mg/sec/L) | |
| --- | --- | --- | --- |
| NO oxidation catalyst | $NO_2$ decomposition catalyst | 200° C. | 250° C. |
| Example 1 | Pt/WO$_3$/ZrO$_2$ | Pt/Ba/γ-alumina | 0.04 | 0.12 |
| Example 2 | Pt/WO$_3$/ZrO$_2$ | Fe/γ-alumina | 0.04 | 0.11 |
| Comp. Ex. 1 | | Pt/Ba/γ-alumina | 0.012 | 0.05 |
| Comp. Ex. 2 | Upstream Pt/silica + monolith filter | | 0.002 | 0.006 |

Catalyst components: (2 g Pt + 0.1 g Rh)/1L filter

The results shown in Table 3 demonstrate that the catalysts of the invention exhibited a notably higher particulate matter oxidation rate than the catalyst of Comparative Example 1, clearly showing the effect on particulate matter oxidation by the catalysts of the invention comprising both an NO oxidation catalyst and an $NO_2$ decomposition catalyst. Although the catalyst of Comparative Example 1 exhibited high $NO_2$ decomposition performance, as shown in Table 2, the particulate matter oxidation rate was lower than that of the catalysts of the invention. This is believed to indicate that the NO oxidation performance shown in Table 1 is one factor controlling active oxygen production at low temperature, and is important for oxidation of particulate matter.

Comparative Example 2 exhibited a very low oxidation rate, and the reason is believed to be that no active oxygen was released because of the absence of an $NO_2$ decomposition catalyst, and therefore oxidation was promoted only by the reactivity between the $NO_2$ and particulate matter. It is thought that according to the invention, however, wherein NO oxidation and $NO_2$ decomposition were repeatedly accelerated in the catalyst, the resulting abundant active oxygen produced at low temperature considerably enhanced the particulate matter oxidation rate.

INDUSTRIAL APPLICABILITY

As explained above, the present invention provides an effect whereby particulate matter emitted from diesel engines can be combusted at much lower temperatures than according to the prior art.

The invention claimed is:

1. A particulate matter combustion catalyst comprising an NO oxidation catalyst and an $NO_2$ decomposition catalyst, wherein the NO oxidation catalyst comprises a catalyst component selected from the group consisting of platinum, gold, and mixtures thereof, carried on an acidic first carrier selected from the group consisting of silica, silica alumina, zeolite with an $SiO_2/Al_2O_3$ ratio of 40 or greater, tungstic acid/zirconia, antimonic acid/alumina, and mixtures thereof, and the $NO_2$ decomposition catalyst comprises a catalyst component selected from the group consisting of the transition metals selected from the group consisting of iron, manganese, cobalt, copper, nickel, vanadium, yttrium, zinc, niobium and molybdenum, carried on a second carrier selected from the group consisting of titania, zirconia, titania-zirconia, alumina, and mixtures thereof, and wherein the NO oxidation catalyst and the $NO_2$ decomposition catalyst are separate powders present in a randomly mixed state in the particulate matter combustion catalyst.

2. A particulate matter combustion catalyst comprising an NO oxidation catalyst and an $NO_2$ decomposition catalyst, wherein the NO oxidation catalyst comprises a catalyst component of platinum, carried on an acidic first carrier of tungstic acid/zirconia, and the $NO_2$ decomposition catalyst comprises platinum and barium, carried on a second carrier alumina, and wherein the NO oxidation catalyst and the $NO_2$ decomposition catalyst are separate powders present in a randomly mixed state in the particulate matter combustion catalyst.

3. A particulate matter combustion catalyst according to claim 1, wherein said NO oxidation catalyst and said NO2 decomposition catalyst are carried on a particulate matter filter.

4. A particulate matter combustion catalyst according to claim 2, wherein said NO oxidation catalyst and said $NO_2$ decomposition catalyst are carried on a particulate matter filter.

5. The particulate matter combustion catalyst according to claim 1, wherein the NO oxidation catalyst is platinum carried on tungstic acid/zirconia, and the $NO_2$ decomposition catalyst is iron carried on alumina.

* * * * *